United States Patent

[11] 3,599,433

[72] Inventors Takao Murata
　　　　　　　Yaizu;
　　　　　　　Atsushi Kudo, Fujieda, both of, Japan
[21] Appl. No. 746,530
[22] Filed July 22, 1968
[45] Patented Aug. 17, 1971
[73] Assignee Sumitomo Durez Company, Ltd.
　　　　　　　Tokyo, Japan
[32] Priority July 24, 1967
[33] 　　　　 Japan
[31] 　　　　 42/47187

[54] METHOD OF SOIL STABILIZATION AND LEAKAGE PREVENTION
5 Claims, 1 Drawing Fig.

[52] U.S. Cl. .................................................. 61/36,
　　　166/295, 260/17.5, 260/29.3, 260/51.5, 260/59
[51] Int. Cl. ....................................................... E02d 3/12,
　　　　　　　　　　　　　　　　　　　　　　　　　E21b 33/13
[50] Field of Search............................................ 260/17.5,
　　　29.3, 29.4, 78.3; 166/295; 252/8.5; 61/36 R

[56] References Cited
UNITED STATES PATENTS

| | | | |
|---|---|---|---|
| Re 23,393 | 7/1951 | Kurtz et al. .................. | 166/22 |
| 3,103,248 | 9/1963 | O'Brien ......................... | 260/78.3 X |
| 3,200,070 | 8/1965 | Herrick ......................... | 252/8.5 |
| 3,325,426 | 6/1967 | Markham ...................... | 260/17.5 |
| 3,391,542 | 7/1968 | Herrick et al. ................ | 61/36 |
| 3,305,017 | 2/1967 | Dollarhide..................... | 166/33 |

Primary Examiner—Harold D. Anderson
Assistant Examiner—E. Nielsen
Attorneys—Peter F. Casella and James F. Mudd ABSTRACT: The present invention relates to the method of soil stabilization and leakage prevention by means of a so-called "chemical grout" using synthetic resin compositions which comprise a strong alkaline phenol formaldehyde resin liquid and a required hardening agent and/or a suitable gelation inhibitor, for example, by filling the said resin composition into the crevices and cracks of the rock bed, construction joints of concrete dam, voids of gravel, etc., for the prevention of leakage, and by grouting the said resin composition into soft ground for solidification, or by grouting into the wall of petroleum well for the prevention of crumbling and other applications for the prevention of seepage of spring water which occurs frequently in the various civil engineering works.

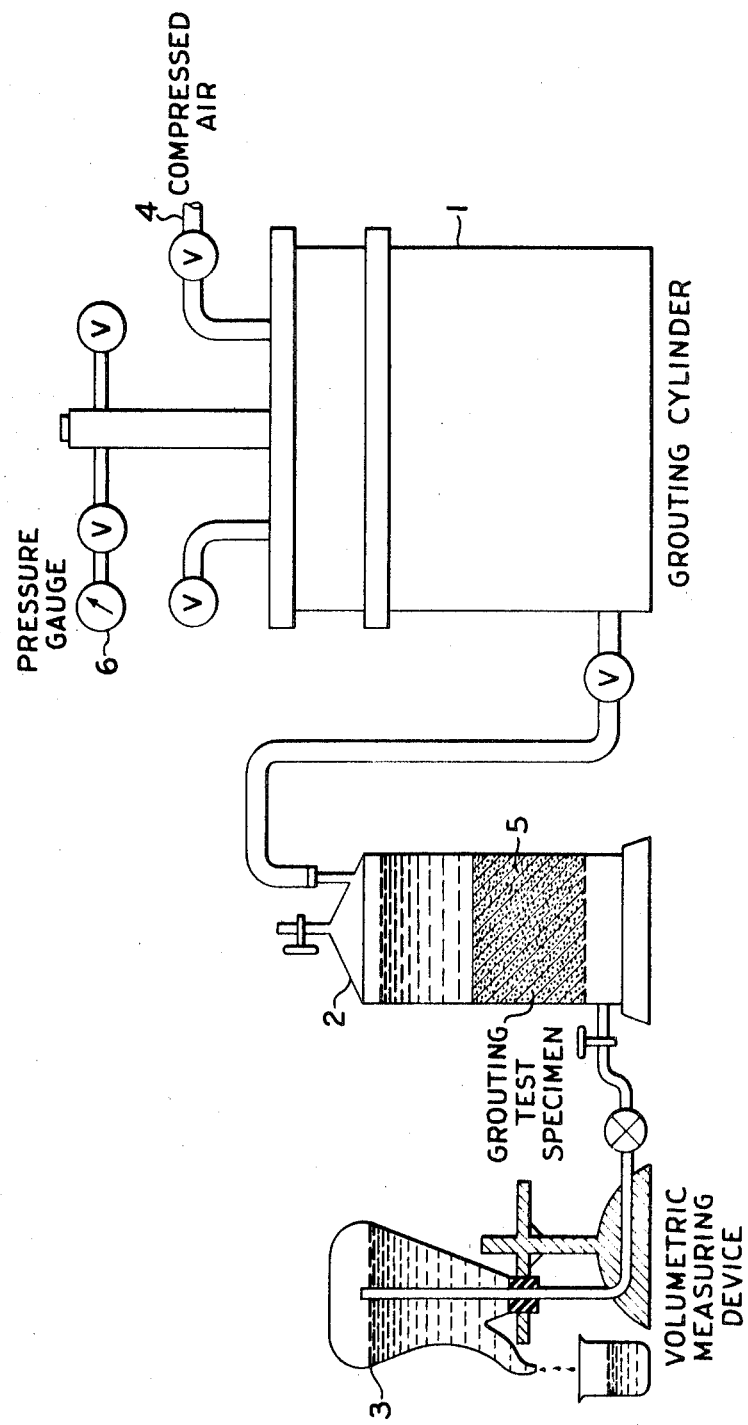

METHOD OF SOIL STABILIZATION AND LEAKAGE PREVENTION

More particularly, the present invention relates to a method of soil stabilization and leakage prevention whereby a resin composition comprising a water soluble strong alkaline liquid phenol formaldehyde resin with a pH of 9.5 or more and having a molar ratio of phenol to formaldehyde between 1:1.5 and 1:3.0, and a lactone which amounts to 1 to 30 percent by weight of the liquid resin and which acts as a hardening agent, and sometimes an adequate amount of alcohol added as a gelation inhibitor to the said mixture, is grouted into rock bed, concrete dam work joints, a gravel layer, weak ground or an oil well, etc., and then hardens at normal temperature within the required time not only in the voids of the soil or sand grains but also in the presence of water or oil.

Usually, for such kind of soil stabilization and leakage prevention, an aqueous cement suspension, water glass (sodium silicate), an aqueous emulsion of bituminous material, chrome-lignin or acrylamide, etc. are used. An aqueous cement suspension can be handled and grouted very simply and performance is excellent for the leakage prevention for hard ground having a wide opening such as a crack in rock bed or for the reinforcement of bearing power of ground foundation; however, when it comes to an opening narrower than 0.1 millimeter, it is difficult to grout the crack. Also this usual method is unfit for use in those instances where it is needed to harden the grouted liquid rapidly, for it usually takes several hours for hardening.

Water glass is applied either as a single liquid or as a mixture of two liquids. It is comparatively easy to adjust its hardening time by changing the hardening agent. It is characterized by imparting higher strength to the ground foundation after hardening of the grouted liquid. It is generally used in cases for need of rapid curability and high strength. But since its viscosity as grouting liquid is higher comparatively in the range of 40 to 60 centipoises, it is difficult to grout a narrower opening.

Chrome-lignin is prepared as a grouting liquid by using pulp waste liquor with bichromates as its main raw materials; during the early period following its preparation, it has good percolating properties for fine openings similar to acrylamide described below. But there are a few faults. One needs to raise gradually the viscosity of the prepared liquid. Scores of minutes and/or several hours are needed to finish the hardening process, and even then the ground foundation has relatively weak strength after curing, and so forth.

Acrylamide is being used most widely at present as a chemical grout liquid agent. Its hardening takes place almost instantaneously after a definite time following preparation of the liquid and its viscosity prior to the start of hardening is 1.2 centipoise which is approximately the same as that of water, so it has a characteristic of being able to percolate into minute cracks, but it has a disadvantage of being more expensive.

There are some method of use inventions already patented which claim the use of liquid phenol formaldehyde resin as a chemical grouting agent. For example, in U.S. Pat. No. 2,485,527 a phenol-formaldehyde resin liquid is prepared from reacting alkaline phenol and formalin and then neutralizing after washing with water, followed by partial reaction with resorcinol. For actual application of the said reaction product, it is hardened by use of an aqueous sodium hydroxide solution. The disadvantage of this resin lies in its need of a large amount of expensive resorcinol, so it is considered that feasibility of practical use of this resin in the field of the civil-engineering works is unlikely for some time to come. Accordingly, although it is worth considering means of adjustment of the cost by decreasing the amount of resorcinol in this case, this will lead to a longer time required for hardening and difficulty in hardening when it is in presence with oil and/or salts. Moreover, it has a disadvantage of being temperature sensitive which causes much delay in hardening at temperatures from 5° to 10° C., and so forth.

The present invention is a method of soil stabilization and leakage prevention characterized in that a strong alkaline liquid phenol formaldehyde resin overcomes those defects described hereinbefore and is comparatively low priced, which is blended with lactones and then the mixture is easily grouted into the required soil and readily hardens therein.

The inventors have found the usefulness of a water soluble strongly alkaline liquid phenol formaldehyde resin having a molar ratio of phenol to formaldehyde between 1:1.5 and 1:3.0 with a pH of 9.5 or more which rapidly cures in soil when admixed with lactones even in the presence of large amounts of water, so that prevention of leakage is secured by its ability to fill crevices or cracks of rock bed, or construction joints of a concrete dam, voids of gravel (layer), and other emergency applications for leak prevention of spring water which occur frequently during various civil-engineering works. Moreover, easy permeation of soft ground by the resin adds reinforcement to it or prevents collapse of the wall of a petroleum well.

However, in case of a molar ratio of phenol to formaldehyde less than 1:1.5, insufficient gelation or only a slight increase in viscosity without gelation occurs to the liquid phenol formaldehyde resin composition herein in admixture with lactones, regardless of the pH of the liquid resin. And in case of a molar ratio of phenol to formaldehyde more than 1:1.5 and with a pH of 9.5 and/or less, gelation does not take place until addition of lactones surpasses more than 30 percent of the resin. Should gelation be required in such a case, increasing the temperature is necessary for the addition of large amounts of lactones.

In realizing the present invention, in order to make a strong alkaline liquid phenol formaldehyde resin, more than 9.5 in pH value, it is preferable to use caustic soda, but caustic potash, calcium hydroxide or barium hydroxide, etc. also may be used, and in these cases they show substantially the same effect as caustic soda.

And by replacing a part of phenol of the composition of the strong alkaline liquid phenol formaldehyde resin described herein, with cresols, resorcinol, urea, melamine or lignin, and so on, substantially the same effect can be obtained.

In the present invention, it is most preferable to use $\beta$-propiolactone as a hardening agent and also there are other lactones which can be recommended, such as $\beta$-butyrolactone, $\gamma$-butyrolactone, caprolactone, valerolactone, etc. Mixtures of lactones can also be used. Each one shows a remarkable effect as hardening agent, that is, they increase the rate of polymerization of the phenol-formaldehyde resin. Also effectiveness of soil stabilization and leakage prevention appears to be unexpectedly superior to use of either the lactone alone or the phenol formaldehyde alone, or to what would be expected from using the two additively. The required quantity of these lactones to be added to the strong alkaline liquid phenol-formaldehyde resin, is between 1 and 30 percent by weight of the resin and most preferably in the range of 4 to 15 percent. If the added amount is less than 1 percent, gelation does not take place at all or too slowly at room temperature. Moreover, when there is a large amount of water in the grouting liquid, it is preferred to increase the quantity of lactone added, but the exact amount should be also regulated in accordance with difference in composition of the strongly alkaline liquid phenol-formaldehyde resin. Although sufficient gelation occurs when addition of lactones to the liquid phenol-formaldehyde resin exceeds 30 percent, and therefore does not contradict in any way the objects for practical use of the present invention, it has a disadvantage of requiring more care in handling and moreover leads to a substantial rise in cost as a grouting liquid.

Moreover, the inventors have found that methanol, ethanol, butanol, propanol, ethylene glycol, glycerine or other polyhydric alcohols are effective as gelation inhibitors.

To sum up the excellent characteristics of the method of soil stabilization and leakage prevention according to the present invention, they are as follows:

1. It hardens within an optional required time even in coexistence with water, oil, inorganic salts, or sulfides, etc., respectively in any proportion, and imparts strong bonding strength to rock beds or soil sand grains.

2. The grouting liquid retains its low viscosity until start of its hardening (or gelation), so it percolates into very small openings. And also it hardens under lower temperature, somewhere below 5° C.

3. It hardens even in acidic or alkaline soil, and the resulting soil strength after hardening of the liquid resin increases to about 10 kg./cm.$^2$.

4. Hardening proceeds rapidly from a state of low viscosity to a gelled form similar to an addition polymeric resin. Moreover, the resulting hardened substance retains its hydrophilic property.

5. The process of grouting is simple and does not require any special machine or equipment.

The following examples are presented in order to define the invention more fully without any intention of being limited thereby. All parts and percentages described therein are by weight unless specified otherwise.

EXAMPLE 1.

Phenol (1,000 parts), 1,700 parts of formalin (37 percent formaldehyde), and 300 parts of aqueous sodium hydroxide solution (30 percent caustic soda) were charged into a reaction vessel and reacted 30 to 40 minutes at 98° to 100° C. The end point of the reaction of this phenol-formaldehyde resin liquid was decided by its viscosity at 25° C. The properties of the resulting resin liquid was usually as follows:

| | |
|---|---|
| Appearance | : brown liquid |
| Specific Gravity (at 25° C.) | : 1.190 |
| Viscosity (at 25° C.) | : 1—3 poises |
| Gelation Time (at 130° C.) | : 20—25 minutes |
| Solid Content | : 48—50% |
| pH | : 10—11 |
| Water Tolerance | : more than 20 times |

When a hardening agent, β-propiolactone was added to this strong alkaline liquid phenol-formaldehyde resin, it gelled rapidly at room temperature.

A grouting liquid for soil stabilization was made according to the following formula:

| | |
|---|---|
| The liquid resin | : 100 parts |
| Water | : 200 parts |
| β-Propiolactone | : 8 parts |

The grouting liquid formulated herein had a very low viscosity, 0.1 to 0.2 poise, so it percolated easily into minute openings of a soil sample and hardened thereon. The resulting soil strength after hardening was between 5 and 10 kg./cm.$^2$.

Detailed description of the grouting test is as follows:

In the FIGURE, 1 represents the cylinder with piston which contains the resin composition, 2 is the tank for sand grains where grouted test specimens are formed, 3 is the measuring apparatus for the grouting liquid. For obtaining a test specimen, the resin composition is transferred from 1 to 2 by compressed air supplied by 4, under fixed pressure adjusted with pressure gauge 6, and is thus percolated into the soil 5 which is tamped previously to a condition having a known coefficient of permeability.

| | |
|---|---|
| Coefficient of permeability of soil before grouting | : 3.68×10$^{13}$ cm./sec. |
| Pressure of grouting | : 1 kg./cm.$^2$ |

The resulting coefficient of permeability of the test specimen after 3 hours from the grouting was 8.17×10$^{17}$ cm./sec.

Furthermore compressive strengths by an uniaxial test after 3 hours and 24 hours standings, respectively, from the grouting on the same test specimen were as follows:

| | |
|---|---|
| Size of test specimen | : 4×2Φ cm. |
| Compressive velocity | : 1% strain/min. |

| | Strain | Stress |
|---|---|---|
| Age (after 3 hours) | 3.1% | 7.32 kg./cm.$^2$ |
| Age (after 24 hours) | 3.0% | 10.59 kg./cm.$^2$ |

The results described above, clearly indicate that the resin composition is well sufficient and effective for soil stabilization and leakage prevention.

EXAMPLE 2

Phenol (800 parts), 200 parts of urea, 1,700 parts of formalin (37 percent aqueous formaldehyde solution) and 30 percent aqueous caustic soda solution were charged into a reaction vessel, and reacted 30 to 40 minutes at 98° to 100° C. The end point of the reaction was decided by viscosity of this reacted phenol-formaldehyde resin liquid at 25° C. The properties of the resulting resin liquid were as follows:

| | |
|---|---|
| Appearance | : brown liquid |
| Specific Gravity (at 25° C.) | : 1.190 |
| Viscosity (at 25° C.) | : 1—3 poises |
| Gelation Time (at 130° C.) | : 20—30 minutes |
| Solid Content | : 48—50% |
| pH | : 10—12 |
| Water Tolerance | : more than 20 times |

When 4 to 10 percent of β-butyrolactone was added to the liquid phenol-formaldehyde resin obtained hereby, it gelled rapidly at room temperature. Therefore, the resulting resin can be used as a soil stabilizing agent just like the phenol-formaldehyde resin liquid as described in example 1.

What we claim is:

1. The method of soil stabilization and leakage prevention comprising introducing into the formation to be treated a composition comprising a water soluble strongly alkaline liquid phenol-formaldehyde resin having a pH of at least 9.5 and having a molar ratio of phenol to formaldehyde between 1:1.5 and 1:3.0, and a lactone which is employed in a proportion of 1 to 30 percent of the liquid resin.

2. The method of claim 1 wherein an alcohol is employed in said composition as a gelation inhibitor.

3. The method of claim 1 wherein a part of the phenol in the phenol-formaldehyde resin is replaced by a compound selected from the group consisting of melamine, urea, lignin, cresols and resorcinol.

4. The method of claim 1 wherein the lactone is betabutyrolactone.

5. The method of claim 1 wherein the lactone is betapropiolactone.

PO-1050
(5/69)

UNITED STATES PATENT OFFICE
CERTIFICATE OF CORRECTION

Patent No. 3,599,433      Dated August 17, 1971

Inventor(s) - Takao Murata and Atsushi Kudo

It is certified that error appears in the above-identified patent and that said Letters Patent are hereby corrected as shown below:

On the front page, after "ABSTRACT" read

---A method of soil stabilization and leakage prevention characterized by using a resin composition which comprises a water soluble strongly alkaline liquid phenol formaldehyde resin with a pH of 9.5 or more and having a molar ratio of phenol to formaldehyde between 1:1.5 and 1:3.0 and a lactone which is added in a proportion of 1 to 30 percent of the liquid resin. An alcohol may be added as a gelation inhibitor, if required. ---.

Column 3, line 63, for "$3.68 \times 10^{13}$" read --- $3.68 \times 10^{-3}$ ---; Column 4, line 2, for "$8.17 \times 10^{17}$" read --- $8.17 \times 10^{-7}$ ---.

Signed and sealed this 25th day of April 1972.

(SEAL)
Attest:

EDWARD M. FLETCHER, JR.      ROBERT GOTTSCHALK
Attesting Officer      Commissioner of Patents